United States Patent [19]

Fay et al.

[11] 3,719,929

[45] March 6, 1973

[54] MEMORY ANALYZERS

[75] Inventors: Robert L. Fay, Newbury Park; Guido F. Simonetti, Canoga Park, both of Calif.

[73] Assignee: Litton Systems, Inc., Beverly Hills, Calif.

[22] Filed: Aug. 11, 1971

[21] Appl. No.: 170,819

[52] U.S. Cl. ..............................340/172.5, 340/146.1

[51] Int. Cl. ..............................G06f 7/06

[58] Field of Search ..............................340/146.1, 172.5

[56] References Cited

UNITED STATES PATENTS 3,340,513 9/1967 Kinzie et al..............................340/172.5

*Primary Examiner*—Paul J. Henon
*Assistant Examiner*—Paul R. Woods
*Attorney*—Alan C. Rose et al.

[57] ABSTRACT

A memory analyzer is provided with a disturb mode for selectively writing complemented test data into a computer memory. The writing operation is repeated a number of times, for example, 5,000 write cycles, and the data is thereafter read out and compared to the original data to detect errors. Hence, the effect of repeated write operations in selected locations on data in non-selected locations can be determined. One feature resides in the provision of a "B increments A" mode whereby access to an A address register is incremented upon each cycle of access to a B address register.

23 Claims, 4 Drawing Figures

ROBERT L. FAY
GUIDO P. SIMONETTI
INVENTORS

BY Robert M. Angus
ATTORNEY

ROBERT L. FAY
GUIDO P. SIMONETTI
INVENTORS

BY Robert M. Angus
ATTORNEY

MEMORY ANALYZERS

This invention relates to memory analyzers, and particularly to memory analyzers capable of checking the operability of computer memories.

Post and film memory systems, such as described in the copending application of Kenneth R. Carter, Ser. No. 162,391, filed July 14, 1971, for "Conductor Grids For Post And Film Memory Systems" and assigned to the same assignee as the present invention, are capable of achieving a higher memory density for the storage of information than has been previously achieved. The ability of such memory systems to function effectively in a computer system dictates that information stored in one location may be accessed without disturbing or affecting information stored in other locations.

Heretofore, memory systems have been tested for operability by conventional analyzer apparatus designed to test the ability to read and write information from and to the memory system. While such analyzer apparatus have been capable of performing complex "worst" condition tests on the memory system, they have not been capable of repetitively writing data into selected memory elements to determine the effect of such repeated writing on data stored in adjacent memory elements.

Another important function not previously achieved by prior analyzers is the ability to read or write data from or to all positions of one address register and then determine the affect of such operation on a single location of another address register and vice versa.

It is an object of the present invention to provide improved apparatus for analyzing computer memory systems, particularly the class having relatively high memory densities.

It is another object of the present invention to provide apparatus for disturbing selected memory elements of a memory system and to determine the affect of such disturbance on other memory elements.

It is yet another object of the present invention to provide apparatus for accessing registers associated with memory systems to increment one register from the cycling of another register.

In accordance with the present invention, analyzing apparatus is provided with disturb means for simulating repeated reading of data into selected bit locations in a computer memory, and means is provided for determining the affect of such disturbance on other bit locations within the computer memory.

According to one feature of the present invention, the disturb means is provided with means for conditioning alternate address registers associated with the word lines of a memory system, and means is provided for sequencing the address register through repeated cycles to simulate multiple writing of data into the computer memory along the alternate word lines. Upon completion of the simulation of writing information into the computer along selected word lines, information is read from the computer memory and compared with the original data to determine errors in the computer memory system.

In accordance with another aspect of the present invention, the address registers may be divided into two groups and means is provided for sequentially reading or writing data to or from all of the registers of one group, and thereafter activating one of the registers of the second group, and thereafter sequencing all the registers of the first group, and so on.

The above and other features of this invention will be more fully understood from the following detailed description and the accompanying drawings, in which.

Figure 1:
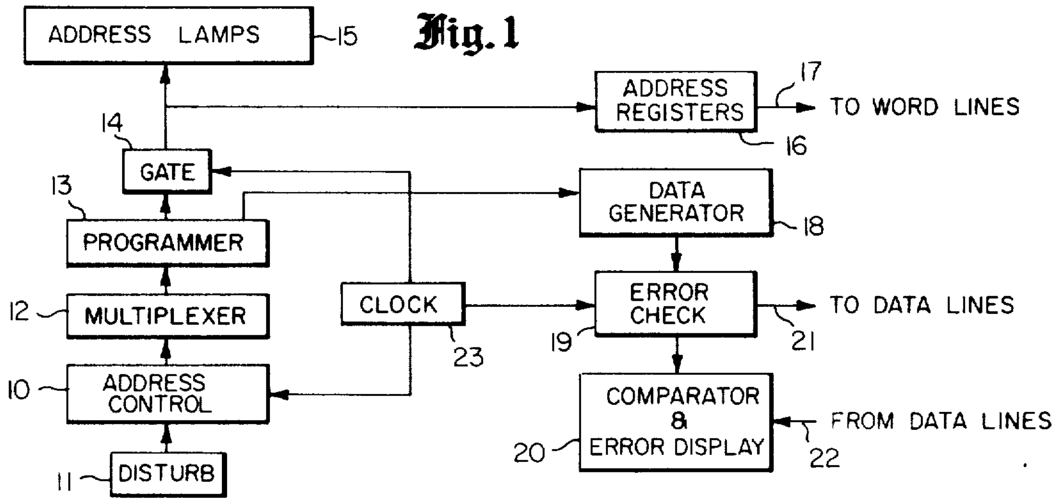
FIG. 1 is a block circuit diagram of a memory analyzer in accordance with the presently preferred embodiment of the present invention.

Referring to FIG. 1, there is illustrated a block circuit diagram of analyzer apparatus in accordance with the presently preferred embodiment of the present invention. The apparatus includes an address control 10 having a disturb circuit 11 as an input thereto. The output from address control 10 is fed through multiplexer 12 to programmer 13 and thence to gate 14. By way of example, programmer 13 may include a plurality of manually operable switches for manual access to various word lines or addresses of a computer memory. The output of gate 14 is forwarded to address lamps 15 and to address registers 16. Register 16 includes address registers for addressing each word line of a computer memory. For example, the computer memory may include twenty-eight word lines separated into two groups of fourteen each and accessed through separate A and B registers. Register 16 has separate leads 17 connected to separate ones of the word lines of the computer memory (not shown).

Data generator 18, which may, for example, comprise suitable data input means such as manually operable switches, magnetic tapes, or the like, provides an input to error check circuit 19 which in turn provides an output to comparator and error display circuit 20. Data from data input circuit 18 is forwarded to the data lines of a memory system by means of channel 21. For example, if 36 data bits appear on each word line of a memory system, channel 21 includes 36 separate leads to each of the 36 data lines. Likewise, data from the separate data lines is forwarded via channel 22 to comparator error display circuit 20. A master clock 23 provides time sequence pulses for the entire system.

The memory analyzer illustrated in FIG. 1 is, with the exception of the disturb circuit 11 and certain logic associated with address control 10, substantially conventional. Address control 10 provides information to the word lines to secure access to one or more of the word lines associated with the memory system. Programmer 13 provides the address code, and controller 10 determines the mode of operation of the address registers. Address lamps 15 indicate the particular address lines being investigated. Data generator 18 provides an input to the memory system, and the information from the memory may be read out through a comparator error display circuit. A read/write control circuit (not shown in FIG. 1) is provided to control the read and write modes of the analyzer.

Address control 10 selects the mode of operation for addressing the word lines of the computer memory. For example, and where two word control registers are associated with the memory, for example, an A register and a B register, the mode control established by address control 10 might sequence the B register after the A register, analyze only the A register lines, or alternate between the A and B registers. The logic associated with the foregoing three modes is conventional and need not be described in detail, except to the extent that they interconnect with the improvements in accordance with the present invention.

One aspect of the present invention resides in apparatus to access a line of one register after sequencing all lines of another register. Thus, if all lines of the B register are accessed in sequence, the apparatus according to the present invention accesses one word line of the A register after completion of access to all B addresses, and thereafter again accesses the B registers in sequence. This mode is hereinafter referred to as B increments A wherein the complete cycle of the B register increments the A register. It is to this aspect that the logic block diagram illustrated in FIG. 2 is directed.

Figure 2:
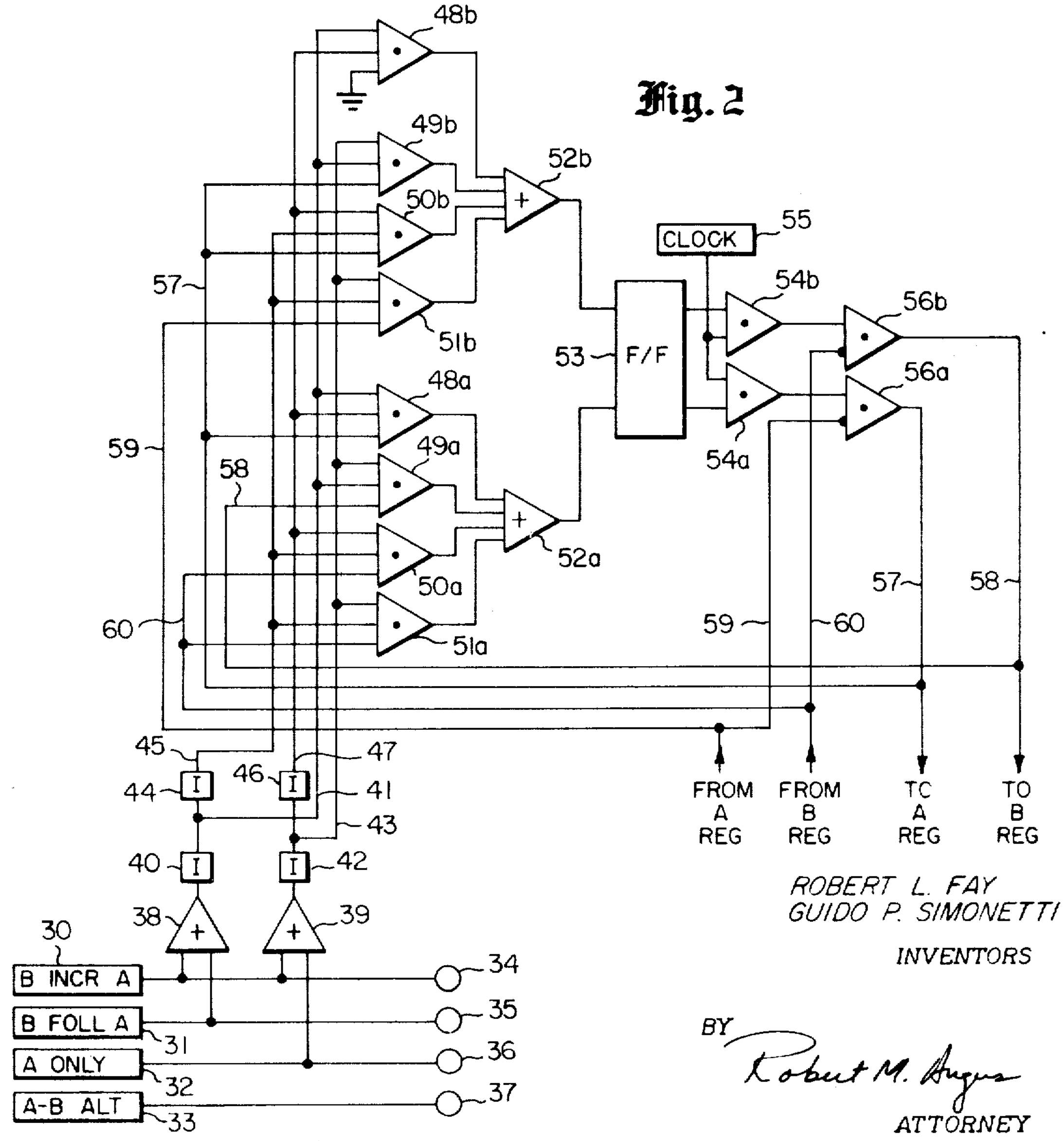
FIG. 2 is a block circuit diagram of logic circuitry associated with an address control for the apparatus as illustrated in FIG. 1.

In FIG. 2 there is illustrated mode control switches 30, 31, 32 and 33 which are connected to lamps 34, 35, 36 and 37 respectively. By way of example, switch 30 may be identified as a B increments A switch, switch 31 may be identified as a B follows A switch, switch 32 may be identified as an A only switch, and switch 33 may be identified as a "A-B alternate" switch. Initiation of respective ones of these switches will operate a particular lamp 34–37 to indicate which mode switch 30–33 has been operated. OR gate 38 has two inputs connected to switches 30 and 31, and OR gate 39 has two inputs connected to switches 30 and 32. The output of OR gate 38 is connected through inverter 40 to lead 41 and the output of OR gate 39 is connected through inverter 42 to lead 43. The output of inverter 40 is connected through inverter 44 to lead 45 and the output of inverter 42 is connected through inverter 46 to lead 47.

A plurality of AND gates **48*a*, 49*a*, 50*a*, 51*a*, 48*b*, 49*b*, 50*b* and 51*b*, each have three inputs. Two of the inputs of each of AND gates 48*a*–51*a* and 48*b*–51*b* are connected to respective leads 41, 43, 45 and 47. For example, gates 48*a* and 48*b* are connected to leads 41 and 47, gates 49*a* and 49*b* are connected to leads 41 and 43, gates 50*a* and 50*b* are connected to leads 45 and 47, and gates 51*a* and 51*b* are connected to leads 43 and 45. The outputs from each of AND gates 48*a*, 49*a*, 50*a* and 51*a* are connected through OR gate 52*a* to one side of bistable multivibrator or flip-flop 53. The outputs from AND gates 48*b*, 49*b*, 50*b* and 51*b* are connected through OR gate 52*b* to the other input of flip-flop 53. Flip-flop 53 has a first output connected to one side of AND gate 54*a* and a second output connected to one input of AND gate 54*b*. The other input for each of AND gates 54*a* and 54*b* are connected to clock 55, which may, for example, comprise part of master clock 23 in FIG. 1. The output from AND gate 54*a* is connected to the AND input of AND-NOT gate 56*a*, whose output is connected to lead 57, and the output from AND gate 54*b* is connected to the AND input of AND-NOT gate 56*b* whose output is connected to lead 58. Lead 57 is connected to the input of the A register, and lead 58** is connected to the input of the B register, to be described in further detail.

Lead 59 is connected to the NOT input of AND-NOT gate **56*a*, and lead 60 is connected to the NOT input of AND-NOT gate 56*b*. As will be more fully understood hereinafter, lead 59 is from a maximum sensing circuit associated with the A register and lead 60 is from the maximum sensing circuit associated with the B register. Hence, when either register has cycled through its entire cycle, a signal will appear on the appropriate lead 59 or 60**.

Lead 57 is connected to the third input of AND gates **48*a*, 49*b* and 50*b*; lead 58 is connected to gate 49*a*; lead 59 is connected to gate 51*b*; and lead 60 is connected to gates 50*a* and 51*a*. The third input to gate 48*b* is grounded so that gate 48*b* will not operate. (It is understood that gate 48*b*** may be eliminated).

Figure 3:
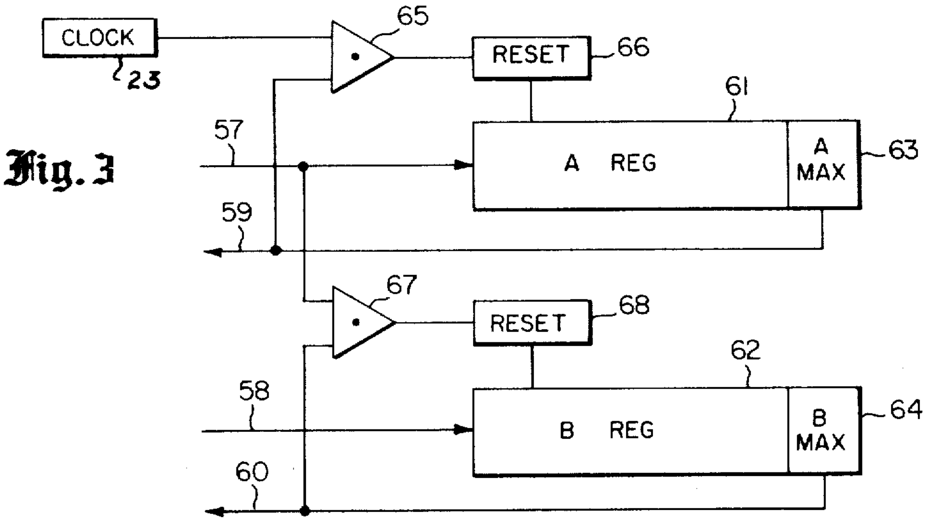
FIG. 3 is a block circuit diagram of address reset circuitry utilized with the logic illustrated in FIG. 2.

FIG. 3 illustrates a block circuit diagram of apparatus for resetting the A and B registers when they have cycled through their entire cycle. Each of the registers 61 and 62 include a plurality of register elements, such as flip-flops, or the like, connected to individual ones of the word lines in the computer memory. The last flip-flop 63 and 64 represent the maximum flip-flop of each register 61 and 62. By way of example, if register 61 is the A register, a signal appearing on line 59 from position 63 represents a maximum condition of the A register. Likewise, if register 62 is the B register, a signal appearing on line 60 from position 64 represents a maximum condition of the B register. AND gate 65 has two inputs, one connected to lead 59 and the other to clock 23, and an output connected to reset circuit 66 for resetting A register 61. Likewise, AND gate 67 has two inputs, one connected to lead 60 and the other to clock 23, and has an output connected to reset circuit 68 for resetting B register 62. Hence, in the event that A register 61 has completely cycled to its maximum position 63, a signal appears on lead 59 for one input to AND gate 65. Gate 65 is then operated during the next clock pulse from clock 23 to reset register 61. Likewise, if a maximum condition appears in B register 62, AND gate 67 operates reset circuit 68 to reset B register 62 when a pulse is received from clock 23. Clock 23, which may be operating clock 55, resets the respective register so that the register is conditioned to receive the next pulse from the address control circuit.

Registers 61 and 62 are, in essence, shift registers having separate outputs to the word lines of a memory system. Each register includes separate flip-flops whose states are initially conditioned by programmer 13 in FIG. 1. Thereafter, pulses applied to leads 57 and 58 sequences the respective registers through an entire cycle.

With reference to FIGS. 2 and 3, operation of the various modes controlled by switches 30–33 may be explained. Assuming first that the A–B alternate switch 33 has been operated, neither OR gate 38 or 39 is operated. Hence, by virtue of inverters 40 and 42, signals appear on leads 41 and 43. These signals condition two of the three inputs for each of AND gates **49*a* and 49*b*. Assuming a signal is being applied to the B register via lead 58, AND gate 49*a*, which is connected to lead 58 supplies a signal through OR gate 52*a* to condition flip-flop 53 to operate on AND gate 54*a*. Upon the next synchronization pulse from clock 55, AND gate 54*a* passes the signal to AND-NOT gate 56*a***. Assuming that the A register is not in its maximum condition so no signal appears on lead 59, AND gate 56*a* passes a signal to lead 57 to the A register. At the same time, gate 49*b* is operated to set flip-flop 53 to provide an input to gate 54*b*. Gate 49*a* then turns off due to the absence of a signal on lead 58, and during the next clock pulse from clock 55, gate 54*b* is operated to supply a signal through gate 56*b* (assuming the B register is not in its maximum condition) to supply a signal to the B register via lead 58. The process continues so that a pulse is supplied to the A register, then to the B register, and so on. Upon reaching the maximum condition of either register, the register will be reset by the reset circuitry illustrated in FIG. 3, so that the operation will continue.

In the A only mode, switch 32 is operated thereby operating OR gate 39 so that signals appear on leads 47 and 41 to condition gates 48*a* and 48*b* to an "on" condition. However, gate 48*b* is biased off at all times due to its third connection to ground. Gate 48*a* is connected to lead 57. Assuming a signal appears on lead 57 to the A register, gate 48*a* is retained on so that flip-flop 53 operates gate 54*a* during each clock pulse from clock 55. AND gate 54*a* provides an input to AND-NOT gate 56*a* which provides an output to the A register until the A register reaches a maximum condition. When the A register reaches its maximum condition, it may be reset so that it may accept additional signals.

For the B follows A mode, it is desired to sequence entirely through the A register and thereafter sequence through the entire B register. Switch 31 is operated to operate OR gate 38 so that signals appear on leads 43 and 45 thus providing inputs to AND gates 51*a* and 51*b*. Assuming flip-flop 53 is providing an input to AND gate 54*a* so that an output appears on lead 57 to the A register, and assuming that the B register is in a maximum condition so that a signal appears on line 60, AND gate 51*a* is operated so that flip-flop operates through AND gate 54*a* and AND-NOT gate 56*a* to provide an output to the A register via lead 47. It is understood that additional inhibit circuitry (not shown) may be associated with switch 31 to inhibit resetting one address register until the other register is fully sequenced. When the A register has completely sequenced to its maximum position, a signal appearing on lead 59 turns off AND-NOT gate 56*a* and provides an input to AND gate 51*b* to condition flip-flop 53 to its opposite mode thereby operating the B register. The cycle continues to sequence through the B register until the entire B register is sequenced, at which time flip-flop 53 shifts back to the A register.

It is understood that additional conventional circuitry may be associated with switches 31–33 to perform additional logic controls. However, the circuitry has been shown only as it is associated with switch 30 and its attendant circuitry to illustrate the various modes available in memory analyzers.

In the B increments A mode, operable by switch 30, it is desirable to sequence through the entire B register and then condition one word line by the A register, and thereafter sequence through the entire B register. In this mode, both OR gates 38 and 39 pass signals thereby applying signals to leads 45 and 47. Signals on leads 45 and 47 provide two of the three satisfying conditions for AND gates 50*a* and 50*b*. Assuming flip-flop 53 is conditioned to its B mode, an output signal appears on lead 58 to the B register. Assuming the B register is not in its maximum position, no signal appears on lead 60. AND gate 50*a* is not operated because no signal appears on lead 60. Flip-flop 53 provides a signal to AND gate 54*b* which in turn operates AND-NOT gate 56*b* to sequence the B register. However, when a maximum condition appears in the B register, a signal appears on lead 60 thereby switching off gate 56*b* and conditioning on gate 50*a* to shift flip-flop 53*b* to its opposite condition. Gates 54*a* and 56*a* are operated during the next clock pulse from clock 55. Hence, a single pulse is applied to lead 57 to the A register. Also, gate 50*b* is operated due to its receipt of a conditioning signal from lead 57 to shift flip-flop 53 back to its B position. At the same time, the B register resets by virtue of the circuitry illustrated in FIG. 3 to remove the signal from lead 60 to turn off AND gate 50*a* and to condition AND-NOT gate 56*b* to operate. Thus, the circuit is conditioned to again sequence through the B register. Hence, following each cycle of the B register, the A register increments one position.

Figure 4:
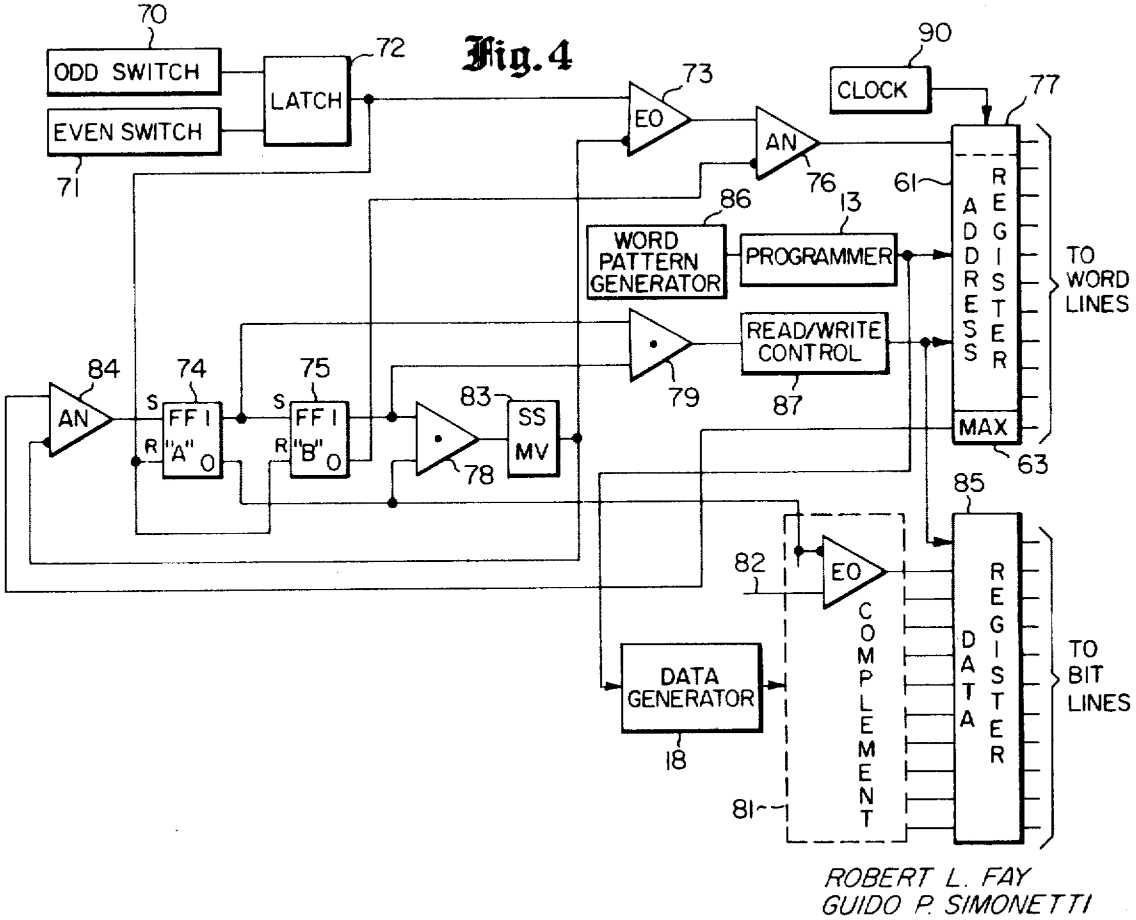
FIG. 4 is a block circuit diagram of disturb means for use with the apparatus illustrated in FIG. 1.

Referring to FIG. 4 there is illustrated a block logic diagram of the disturb mode of the analyzer in accordance with the present invention. Switches 70 and 71 are connected to the input of latch circuit 72, which may, for example, comprise a bistable multivibrator or flip-flop. Switch 70 is designated as an "odd" switch, whereas switch 71 is designated as an "even" switch. As will be more fully explained hereinafter, initiation of switch 70 will cause disturbance of the odd numbered addresses of address register 61 whereas operation of switch 71 will initiate disturbance of the even addresses of address register 61. The output of latch circuit 72 is connected to one input of EXCLUSIVE-OR gate 73 and to one input of each of bistable multivibrators or flip-flops 74 and 75. The output from EXCLUSIVE-OR gate 73 is connected to the AND input of AND-NOT gate 76 whose output is connected to the first register or position 77 of address register 61. Clock 90 is connected to address register 61 to clock the register so as to sequence addresses through each position of address register 61. By way of example, clock 90 may comprise the circuitry illustrated in FIG. 2.

Each of flip-flops 74 and 75 have two inputs designated "set" and "reset" (S and R). Upon application of a signal to the "set" line of a respective flip-flop 74 and 75, the flip-flop switches its output between the outputs designated 1 and 0 (from 0 to 1 or from 1 to 0). Application of a signal to the reset input of a flip-flop switches the output of the flip-flop to its 0 output, regardless of its previous condition. As illustrated in FIG. 4, the 1 output of flip-flop 74 is connected to the "set" input of flip-flop 75. The "reset" inputs for both flip-flop 74 and 75 are connected to the output from latch 72. The 0 output of flip-flop 74 is connected to one input of AND gate 78 whose other input is connected to the 1 output of flip-flop 75. The 1 outputs of each of flip-flop 74 and 75 are connected to the respective inputs of AND gate 79. The 0 output of flip-flop 74 is also connected to the exclusive input of EXCLUSIVE-OR gate 80 in complement circuit 81.

Complement circuit 81 comprises a bank of EXCLUSIVE-OR gates 80 having their exclusive inputs each connected to the 0 output from flip-flop 84 and having the OR input connected to data generator 18 via channel 82 for programming data into the bit lines of a memory. The 0 output of flip-flop 75 is connected to the NOT input of AND-NOT gate 76. The output of AND gate 78 is connected to the input of single-shot multivibrator 83 whose output is connected to the exclusive input of EXCLUSIVE-OR gate 73 and to the NOT input of AND-NOT gate 84. As will be more fully understood hereinafter, single-shot multivibrator 83 is a timing multivibrator which remains on for a predetermined period of time, such as four seconds. The AND input for AND-NOT gate 84 is connected to the output of the maximum position 63 of address register 61. Hence, the AND input to gate 84 is supplied when register 61 reaches its maximum condition. Gate 84 supplies an output to the "set" input of flip-flop 74.

Programmer 13 is, as described in connection with FIG. 1, connected (usually through logic - not shown) to address register 61. Also, programmer 13 is connected to the input of data generator 18 which in turn is connected to the inputs 82 of each EXCLUSIVE-OR gate 80 in complement circuit 81. The output of complement circuit 81 is connected to data register 85 for connection to the bit lines of the memory being analyzed. Preferably, word pattern generator 86 is connected to the input of programmer 13 so as to generate word patterns for register 61. Read/write control 87 has an input connected to the output of AND gate 79 and is connected to address register 61 and data register 85. It is understood that read/write control 87 includes other inputs (not shown) and is connected to the data and address registers through logic circuitry (not shown).

In operation of the disturb mode of the analyzer according to the present invention, one of switches 70 or 71 is initiated to condition latch circuit 72 to produce a signal representative of a 1 or 0 to EXCLUSIVE-OR gate 73 for placing in position 77 of the address register. For example, a 1 output from latch 72 would be representative of an odd condition to disturb only the odd addresses of address register 61 whereas an 0 output from latch 72 would disturb only the even addresses of address register 61. The signal from latch 72 is also forwarded to reset flip-flops 74 and 75 to produce 0 outputs.

If switch 71 is initiated, latch 72 supplies an 0 signal to the first position 77 of register 61 so that as the register is sequenced by clock 90, a 1 will appear in every other position of the register commencing with the second position. Likewise, if switch 70 is initiated, latch 72 supplies a 1 signal to the first position 77 of register 61 so that as the signal is sequenced through the register, a 1 will appear only at the first, third, and so on, positions of the register.

The 0 output from flip-flop 75 is imposed on the NOT input of AND-NOT gate 76 to initially prevent operation of the latch circuit 72 on the address register 61. The 0 output from flip-flop 74 operates on the exclusive inputs of the EXCLUSIVE-OR gates 80 of complement circuit 81 to complement the data from data generators 18 to data register 85. For example, at each position of the data register where a 1 exists, complement circuit 81 substitutes an 0, and conversely at each position of the data register where an 0 exists, complement circuit 81 substitutes a 1.

Read/write control circuit 87 is operated (by means not shown) to sequence the address register 61 to write data from data register 85 into memory. The write operation continues without interference by the disturb circuit illustrated in FIG. 4 until the address register is sequenced to its maximum position 63. A signal is then applied by register position 63 to the AND input of the AND-NOT gate 84 to provide a signal to the "set" side of flip-flop 74. Upon the appearance of the next clock pulse, the address register sequences back to its first position to continue to write information into the memory, flip-flops 74 and 75 are preferably triggered by clock pulses from clock 90 so that during the second writing operation the output from flip-flop 75 is still in its 0 position so that gate 76 is inhibited. Hence, with reference to the truth table appearing below, during an 0 output from flip-flop 75, information is being written into memory through address register 61, and gate 76 is inhibited by virtue of a signal appearing at the NOT input of the gate. Also, while an 0 output occurs from flip-flop 74, the data in data register 85 is complemented.

TRUTH TABLE

| Flip-Flop 74 | Flip-Flop 75 | Function |
|---|---|---|
| 0 | 0 | Write—Gate 76 inhibited, complement data |
| 1 | 0 | Write—Gate 76 inhibited |
| 0 | 1 | Disturb—(e.g., 4 sec.) |
| 1 | 1 | Read |

When the data has been completely written into memory for the second time, thus assuring that the complemented data was completely written into memory, the maximum position 63 of register 61 provides a signal to the AND input of the AND-NOT gate 84 to set flip-flop 74 to its 0 condition and to set flip-flop 75 to its 1 position. With an 0 output from flip-flop 74 and a 1 output from flip-flop 75, AND gate 78 is operated to operate single-shot multivibrator 83. Single-shot multivibrator 83 may, for example, provide a 4 second pulse output to the exclusive input of EXCLUSIVE-OR gate 73 to override any signals from latch 72. The output from gate 73 also operates on the NOT input of gate 84 to inhibit gate 84 from setting flip-flop 74 while an output appears from multivibrator 83. Hence, the 4 second pulse output from multivibrator 83 operates gate 73 to provide a 4 second pulse to address register 61. This pulse is clocked through the register by clock 55 through approximately 5,000 cycles of the register. Upon conclusion of the 4 second pulse from multivibrator 83, the inhibit signal on AND-NOT gate 84 is removed so that when the address register 61 again reaches its maximum position at 63, a signal is forwarded through AND-NOT gate 84 to flip-flop 74 to switch it to its 1 condition.

With signals appearing at the 1 outputs of both flip-flops 74 and 75, AND gate 79 is operated to condition read/write control 87 to operate in the read mode. Thus, information from the memory is read out, complemented, and compared with information previously stored to determine the validity of the information and to detect and indicate errors on the error display circuit 20 illustrated in FIG. 1.

The present invention thus provides two significant control aspects for memory analyzer for analyzing high density memory systems. With the circuit illustrated in FIGS. 2 and 3, it is possible to increment the A address register with the B address register by completely sequencing through the entire B register and then incrementing a single line from the A register. With the disturb apparatus illustrated in FIG. 4 it is possible to simulate repetitive writing of information along selected ones of the address registers and thereafter to read information from the memory to determine whether or not the information in the memory has been affected by the repetitive writing in adjacent memory elements. Hence, with the disturb apparatus according to the present invention it is possible to determine the effect of repetitive writing into selected locations of a memory system on adjacent memory elements of the system to determine the operability of the entire memory system.

While the disturb mode has been described in connection with a 4 second disturb time, it is understood that the length of the disturb time may be any desirable length as determined by the time delay of the single-shot multivibrator 83. The 4 second disturb mode was selected because it closely represents approximately 5,000 write cycles which is satisfactory for most test purposes.

One feature of the present invention resides in the provision of an output from programmer 13 to data generator 18 (FIGS. 1 and 4). This provision permits the processing of data bits into the data register in a unique and different data code for each address line of the memory to permit full and random data bits in the memory for test purposes.

This invention is not to be limited by the embodiments shown in the drawings and described in the description, which are given by way of example and not of limitation, but only in accordance with the scope of the appended claims.

What is claimed is:

1. In a memory analyzer for analyzing the operability of a memory system for a computer, which memory system has a plurality of address and data lines, said analyzer having an address register connected to said address lines and having read/write control means for controlling the reading of information out of said memory system and for controlling the writing of information into said memory system, said analyzer including program means for establishing a predetermined program of addresses in said address register, and data generator means for establishing a predetermined program of data information on said data lines, the improvement comprising:

- disturb means including first control means capable of providing at least three distinguishable output conditions;
- selectable means operable to condition said first control means to provide a first output condition;
- address selection means responsive to a second output condition of said first control means for selecting predetermined ones of the addresses in said address register;
- cycle means responsive to said second output condition of said first control means for cycling the selected addresses through a plurality of write cycles;
- second control means responsive to a third output condition of said first control means for conditioning said read/write control means to read information from said memory system;
- said first control means being responsive to the establishment of said predetermined program of addresses in said address register by said program means for changing the output condition of said first control means from its first to its second output condition, said first control means being further responsive to the completed write cycling of the selected addresses for changing the output condition of said first control means from its second to its third output condition; and
- error display means for comparing information stored in said memory system before said write cycling to information stored in said memory system after said write cycling to display descrepencies therebetween.

2. Apparatus according to claim 1 further including a data register connected to said data lines, said data generator means being adapted to establish said predetermined program of data information in said data register, and complement means responsive to said first output condition of said first control means for establishing the complement of said predetermined program of data information in said data register.

3. Apparatus according to claim 1 wherein said first control means comprises first and second bistable means each having a set input, a reset input, a first output and a second output, each of said first and second bistable means being responsive to a predetermined signal at its respective set input to discontinue a predetermined signal established at one of its outputs and to establish a predetermined signal at the other of its outputs, each of said first and second bistable means being further responsive to a predetermined signal at its respective reset input to discontinue any predetermined signal established at its second output and to establish a predetermined signal at its first output, the reset inputs of each of said first and second bistable means being connected to said selectable means, the second output of said first bistable means being connected to the set input of said second bistable means, first gate means connected to said address register for establishing a predetermined signal at the set input of said first bistable means, said first output condition of said first control means being established by predetermined signal at the first output of said second bistable means, said second output condition being established by predetermined signals at the first output of said first bistable means and the second output of said second bistable means, and the third output condition being established by predetermined signals at the second outputs of said first and second bistable means.

4. Apparatus according to claim 3 wherein said second control means comprises an AND gate means responsive to predetermined signals appearing at the second outputs of said first and second bistable means, said AND gate means having an output connected to said read/write control means.

5. Apparatus according to claim 3 wherein said cycle means comprises AND gate means responsive to predetermined signals appearing at the first output of said first bistable means and at the second output of said second bistable means, and timer means connected to the output of said AND gate means.

6. Apparatus according to claim 5 further including EXCLUSIVE-OR gate means having an OR input connected to said selectable means and having an EXCLUSIVE input connected to said timer means, said EXCLUSIVE-OR gate means having an output adapted to condition said address register.

7. Apparatus according to claim 5 wherein said first gate means comprises AND-NOT gate means having an AND input con-nected to said address register and responsive to an address in the maximum position of said address register and having a NOT input connected to said timer means.

8. Apparatus according to claim 6 further including AND-NOT gate means having an AND input connected to the output of said EXCLUSIVE-OR gate means and having a NOT input connected to the first output of said second bistable means, said AND gate means having an output connected to the first address position of said address register.

9. Apparatus according to claim 8 wherein said second control means comprises second AND gate means responsive to predetermined signals appearing at the second outputs of said first and second bistable means, said second AND gate means having an output connected to said read/write control means.

10. Apparatus according to claim 8 wherein said first gate means comprises second AND-NOT gate means having an AND in-put connected to said address register and responsive to an address in the maximum position of said address register and having a NOT input connected to said timer means.

11. Apparatus according to claim 1 wherein said selectable means comprises latch means capable of providing first and second output signals, first and second switch means connected to said latch means for conditioning said latch means to provide a respective one of said first and second signals.

12. Apparatus according to claim 11 further including a data register connected to said data lines, said data generator means being adapted to establish said predetermined program of data information in said data register, and complement means responsive to said first output condition of said first control means for establishing the complement of said predetermined program of data information in said data register.

13. Apparatus according to claim 11 wherein said first control means comprises first and second bistable means each having a set input, a reset input, a first output and a second output, each of said first and second bistable means being responsive to a predetermined signal at its respective set input to discontinue a predetermined signal established at one of its outputs and to establish a predetermined signal at the other of its outputs, each of said first and second bistable means being further responsive to a predetermined signal at its respective reset input to discontinue any predetermined signal established at its second output and to establish a predetermined signal at its first output, the reset inputs of each of said first and second bistable means being connected to said selectable means, the second output of said first bistable means being connected to the set input of said second bistable means, first gate means connected to said address register for establishing a predetermined signal at the set input of said first bistable means, said first output condition of said first control means being established by predetermined signal at the first output of said second bistable means, said second output condition being established by predetermined signals at the first output of said first bistable means and the second output of said second bistable means, and the third output condition being established by predetermined signals at the second outputs of said first and second bistable means.

14. Apparatus according to claim 13 wherein said second control means comprises an AND gate means responsive to predetermined signals appearing at the second outputs of said first and second bistable means, said AND gate means having an output connected to said read/write control means.

15. Apparatus according to claim 13 wherein said cycle means comprises AND gate means responsive to predetermined signals appearing at the first output of said first bistable means and at the second output of said second bistable means, and timer means connected to the output of said AND gate means.

16. Apparatus according to claim 15 further including EXCLUSIVE-OR gate means having an OR input connected to said selectable means and having an EXCLUSIVE input connected to said timer means, said EXCLUSIVE-OR gate means having an output adapted to condition said address register.

17. Apparatus according to claim 15 wherein said first gate means comprises AND-NOT gate means having an AND input connected to said address register and responsive to an address in the maximum position of said address register and having a NOT input connected to said timer means.

18. Apparatus according to claim 16 further including AND-NOT gate means having an AND input connected to the output of said EXCLUSIVE-OR gate means and having a NOT input connected to the first output of said second bistable means, said AND gate means having an output connected to the first address position of said address register.

19. Apparatus according to claim 1 wherein said analyzer includes first and second address registers, and third control means for incrementing access to said first address register upon each cycle of access to said second address register.

20. Apparatus according to claim 19 wherein said third control means comprises bistable means having first and second outputs connected to said first and second address registers, respectively, first AND gate means connected to a first input of said bistable means to condition said bistable means to provide a signal at its first output and second AND gate means connected to a second input of said bistable means to condition said bistable means to provide a signal at its second output, switch means having an output connected to a first input of each of said first and second AND gate means, maximum position sensing means for sensing the completion of a cycle of access to said second address register, said first AND gate means having a second input connected to said sensing means and said second AND gate means having a second input connected to the second output of said bistable means.

21. Apparatus according to claim 20 further including AND-NOT gate means having its AND input connected to the second output of said bistable means and having its NOT input connected to said sensing means, the output of said AND-NOT gate means being connected to said second address register and to said second input of said second AND gate means.

22. In a memory analyzer for analyzing the operability of a memory system for a computer, which memory system has a plurality of address and data lines, said analyzer having first and second address registers connected to said address lines, the improvement comprising control means for incrementing access to said first address register upon each cycle of access to said second address register, said control means comprising bistable means having first and second outputs connected to said first and second address registers, respectively, first AND gate means connected to a first input of said bistable means to condition said bistable means to provide a signal at its first output and second AND gate means connected to a second input of said bistable means to condition said bistable means to provide a signal at its second output, switch means having an output connected to a first input of each of said first and second AND gate means, position sensing means for sensing the completion of a cycle of access to said second address register, said first AND gate means having a second input connected to said sensing means and said second AND gate means having a second input connected to the second output of said bistable means.

23. Apparatus according to claim 22 further including AND-NOT gate means having its AND input connected to the second output of said bistable means and having its NOT input connected to said sensing means, the output of said AND-NOT gate means being connected to said second address register and to said second input of said second AND gate means.

* * * * *